United States Patent
Maruo

(10) Patent No.: US 12,188,543 B2
(45) Date of Patent: Jan. 7, 2025

(54) MOTOR WITH SPEED REDUCER

(71) Applicant: DENSO CORPORATION, Kariya (JP)

(72) Inventor: Kazuki Maruo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/384,113

(22) Filed: Oct. 26, 2023

(65) Prior Publication Data

US 2024/0052913 A1 Feb. 15, 2024

Related U.S. Application Data

(63) Continuation of application No. PCT/JP2022/005483, filed on Feb. 10, 2022.

(30) Foreign Application Priority Data

Apr. 30, 2021 (JP) .................................. 2021-077980

(51) Int. Cl.
*F16H 19/02* (2006.01)

(52) U.S. Cl.
CPC .................... *F16H 19/02* (2013.01)

(58) Field of Classification Search
CPC ........................................................ F16H 19/02
USPC ............................. 74/437, 116, 61, 332, 89
See application file for complete search history.

(56) References Cited

U.S. PATENT DOCUMENTS

| | | | |
|---|---|---|---|
| 2019/0356196 A1* | 11/2019 | Izuchi | .................. H02K 7/116 |
| 2021/0324942 A1 | 10/2021 | Sakai et al. | |
| 2022/0099161 A1 | 3/2022 | Maruo et al. | |

FOREIGN PATENT DOCUMENTS

| | | |
|---|---|---|
| CN | 104638830 A | 5/2015 |
| JP | 2006-141137 A | 6/2006 |
| JP | 2020-016331 A | 1/2020 |
| JP | 2021-055730 A | 4/2021 |

OTHER PUBLICATIONS

Apr. 12, 2022 International Search Report issued in International Patent Application No. PCT/JP2022/005483.

* cited by examiner

*Primary Examiner* — T. Scott Fix
(74) *Attorney, Agent, or Firm* — Oliff PLC

(57) ABSTRACT

A speed reducer-equipped motor includes a motor, first gear, eccentric shaft, and stopper protrusions. The speed reducer-equipped motor also includes a transmission gear, an output member, a rotation stopper, and an interference avoider. The transmission gear revolves around an axis of the first gear following rotation of the first gear along with the eccentric shaft. The output member rotates following the revolution of the transmission gear. The rotation stopper works to stop the transmission gear from rotating the center thereof in response to sliding motion of the stopper protrusions on the rotation stopper. The interference avoider is arranged between the rotation stopper and the transmission gear and works to avoid physical or mechanical interference of corners of the rotation stopper which are located close to the stopper protrusions with base end portions of the stopper protrusions.

5 Claims, 10 Drawing Sheets

MOTOR WITH SPEED REDUCER

The present application claims the benefit of priority of Japanese Patent Application No. 2021-077980 filed on Apr. 30, 2021, the disclosure of which is incorporated in its entirety herein by reference.

TECHNICAL FIELD

This disclosure relates generally to a motor with a speed reducer.

BACKGROUND OF ART

Patent literature 1 discloses a motor equipped with a speed reducer which reduces the speed of rotation of the motor. The speed reducer includes a worm, a worm wheel, a gear, and an output shaft. The worm is firmly mounted on a rotation shaft of the motor. The worm wheel meshes with the worm. The gear revolves with rotation around the center thereof stopped in response to rotation of the worm wheel. The output shaft rotates in response to torque produced by the revolution of the gear. A rotation stopper is also disposed between the worm wheel and the revolving gear to stop the gear from rotating around the axis thereof.

PRIOR ART DOCUMENT

Patent Literature

Patent Literature 1: Chinese patent publication No. 10468830

SUMMARY OF THE INVENTION

The speed reducer of the motor taught in the above publication is designed to achieve the stop of the rotation of the gear by engaging protrusions provided on the gear with rotation stopper members used to stop the gear from rotating around the axis thereof. It is advisable for such a structure to ensure the stability of physical contact of the protrusions on the gear with the rotation stopper members in order to ensure the durability of the structure or minimize mechanical noise occurring in the structure.

It is an object of this disclosure to provide a speed reducer-equipped motor which is designed to ensure the stability of contact between a protrusion provided on a revolving gear and a stopper member working to stop the gear from rotating around an axis thereof.

According to the first aspect of this disclosure, there is provided a speed reducer-equipped motor which comprises: (a) a motor with a rotating shaft; (b) a first gear which rotates in response to input of torque from the rotating shaft of the motor; (c) an eccentric shaft which includes a support which connects with the first gear and is offset from a rotating shaft of the first gear in a radial direction thereof; (d) a transmission gear which is retained by the support and includes a stopper protrusion protruding toward the first gear, the transmission gear revolving around the rotating shaft of the first gear following rotation of the first gear along with the eccentric shaft; (e) an output member which rotates in response to revolution of the transmission gear; (f) a rotation stopper on which the stopper protrusion slides in contact therewith to stop the transmission gear from rotating around an axis thereof; and (g) an interference avoider which is disposed between the rotation stopper and the transmission gear and works to avoid physical interference between a corner of the rotation stopper which faces the stopper protrusion and a base end portion of the stopper protrusion.

The above structure is capable of achieving the stability of contact of the stopper protrusion with the rotation stopper which stops the transmission gear from rotating around the axis thereof.

BRIEF DESCRIPTION OF THE DRAWINGS

The present disclosure will be understood more fully from the detailed description given hereinbelow and from the accompanying drawings of the preferred embodiments of the invention.

In the drawings.

MODES FOR CARRYING OUT THE INVENTION

Figure 1:
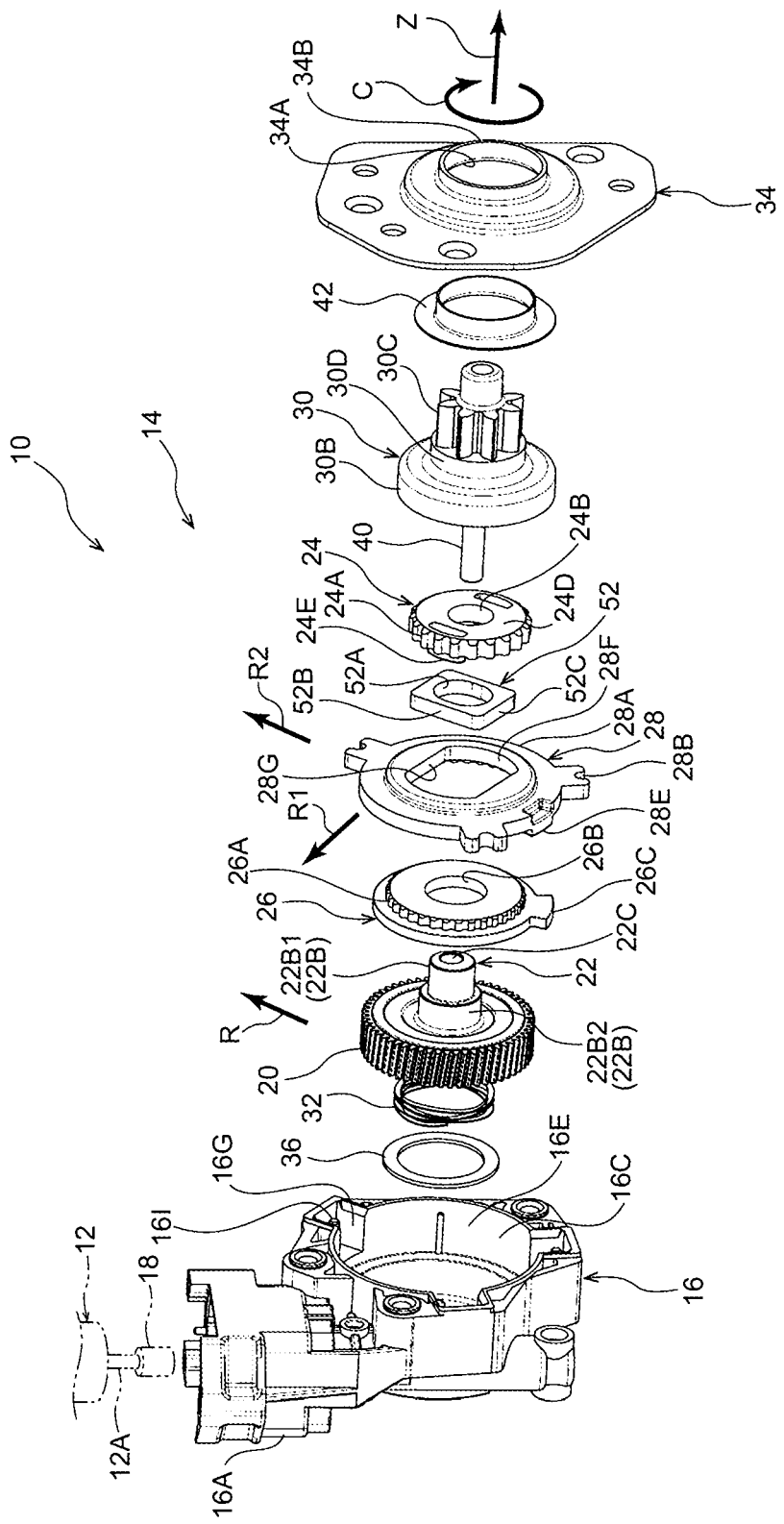
FIG. 1 is an exploded perspective view which shows a speed reducer-equipped motor.

The speed reducer-equipped motor 10 according to an embodiment of this disclosure will be described below with reference to FIGS. 1 to 4.

In the drawings, the Z-direction, as denoted by the arrow Z, represents one of opposite axial directions of the pinion gear 30C working as an output gear. The R-direction, as denoted by the arrow R, represents an outward one of opposite radial directions of the pinion gear 30C. The C-direction, as denoted by the arrow C, represents one of opposite circumferential directions of the pinon gear 30C. A direction opposite the Z-direction will also be referred to as a second axial direction of the pinion gear 30C. A direction opposite the R-direction will also be referred to as an inward or second radial direction of the pinion gear 30C. A direction opposite the C-direction will also be referred to as a second circumferential direction of the pinion gear 30C. Unless otherwise specified, an axial direction, a radial direction, and a circumferential direction, as simply referred to below, represent an axial direction, a radial direction, and a circumferential direction of the pinion gear 30C.

Figure 2:
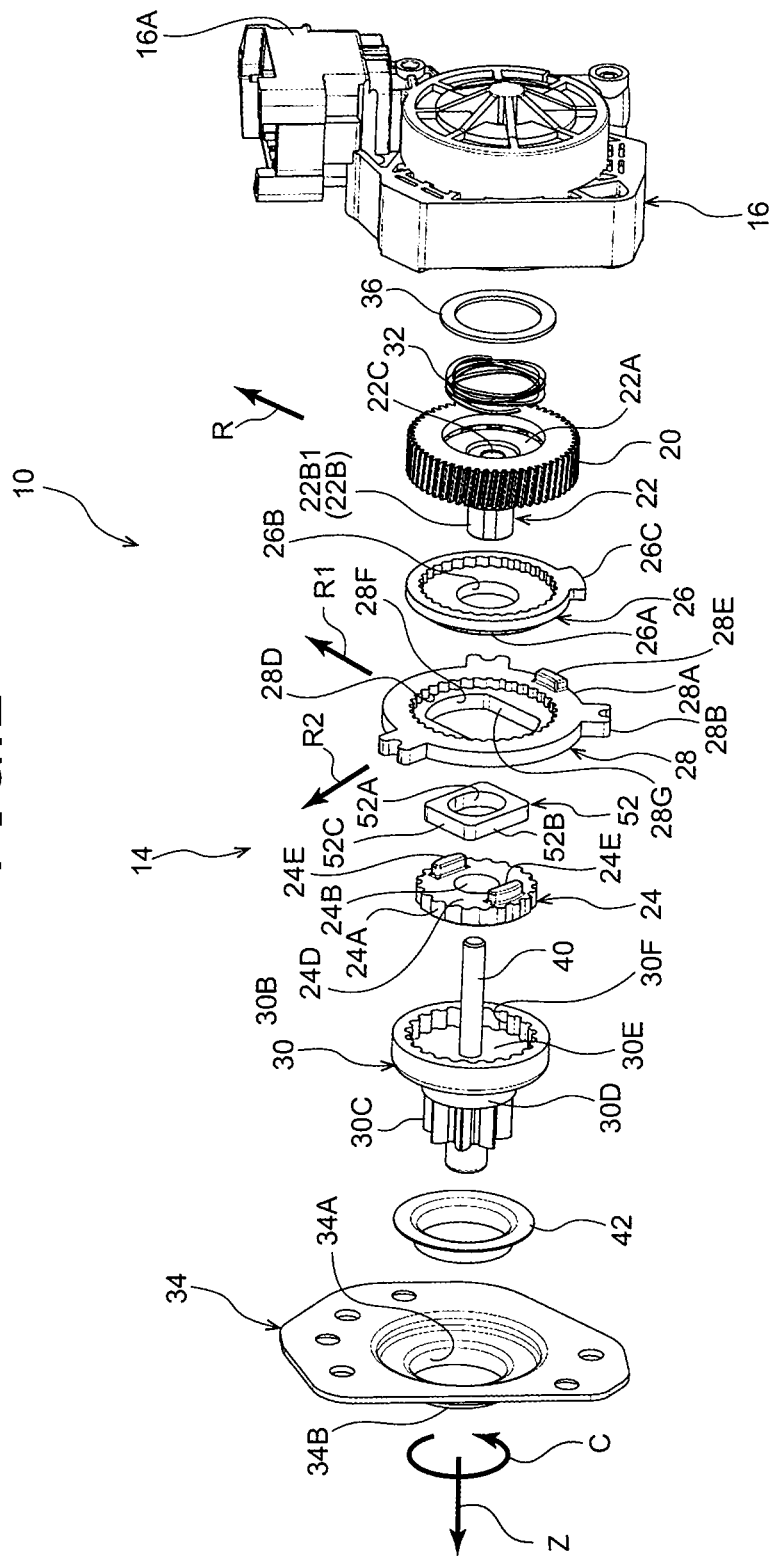
FIG. 2 is an exploded perspective view which shows a speed reducer-equipped motor, as viewed in a direction opposite that in FIG. 1.
Figure 3:
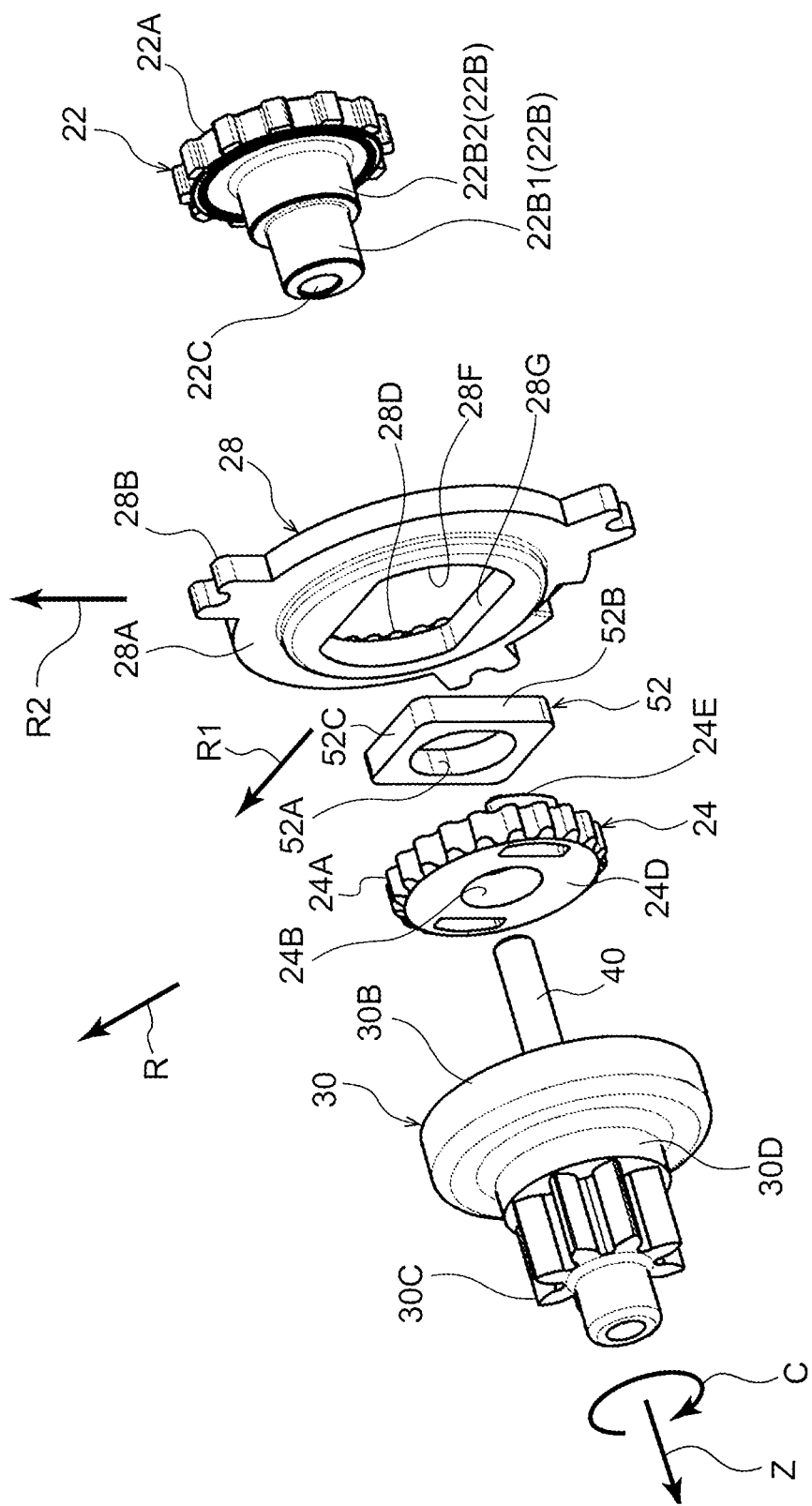
FIG. 3 is an exploded perspective view which illustrates a stationary gear, a transmission gear, and an output gear unit installed in a speed reducer-equipped motor.

The speed reducer-equipped motor 10 illustrated in FIGS. 1, 2, and 3 is designed as a power seat motor working to move the bottom of a car seat in an upward or downward direction. The speed reducer-equipped motor 10 includes the motor 12 implemented by a dc motor. The speed reducer-equipped motor 10 also includes the speed reducer 14 which reduces the speed of rotation of the rotating shaft 12A of the motor 12 and transmits it to the output gear unit 30 serving as an output member of the speed reducer 14. The speed reducer-equipped motor 10 further includes the housing 16 to which the motor 12 is secured and in which the speed reducer 14 is disposed.

The speed reducer 14 includes the worm gear 18, the helical gear 20, and the eccentric shaft 22. The worm gear 18 is firmly secured to the rotating shaft 12A of the motor 12. The helical gear 20 works as a first gear meshing with the worm gear 18. The eccentric shaft 22 is mounted integrally in the helical gear 20.

The speed reducer 14 also includes the transmission gear 24, the lock gear 26, and the stationary gear 28. The transmission gear 24 and the lock gear 26 are retained by the eccentric shaft 22. The stationary gear 28 meshes with the lock gear 26. The speed reducer 14 also includes the slider plate 52 which is retained by the stationary gear 28 and works as a rotation stopper. The rotation of the transmission gear 24 is stopped by meshing the transmission gear 24 with the slider plate 52. The speed reducer 14 also includes the output gear unit 30 which meshes with the transmission gear 24 and is equipped with the pinion gear 30C. The output gear unit 30 has an axis which is oriented in the same direction as those of the helical gear 20, the transmission gear 24, and the lock gear 26, in other words, extends in the Z-direction and a direction opposite the Z-direction. The axis of the output gear unit 30 is arranged in alignment with that of the helical gear 20.

The speed reducer-equipped motor 10 also includes the spring 32 which minimizes the backlash or lost motion of the eccentric shaft 22 and the helical gear 20 in the axial direction thereof. The speed reducer-equipped motor 10 also includes the cover plate 34 which is fixed to the housing 16 to accommodate the speed reducer 14 within the housing 16.

The housing 16 illustrated in FIGS. 1 and 2 is made from resin material. The housing 16 is equipped with the motor retaining portion 16A by which the motor 12 is firmly retained with the rotating shaft 12A extending in a direction perpendicular to the Z-direction. The housing 16 has formed therein the reducer-housing recess 16C in which the speed reducer 14 is accommodated. The reducer-housing recess 16C is of a concave shape with an opening end facing in the axial direction (i.e., the Z-direction).

The reducer-housing recess 16C, as clearly illustrated in FIG. 1, includes a bottom wall and the side wall 16E. The bottom wall defines a bottom of the reducer-housing recess 16C. The side wall 16E extends from an outer circumference of the bottom wall in the axial direction and has a cylindrical inner peripheral surface. The reducer-housing recess 16C has a hollow cylindrical boss, which will be described later, into which an end (which will also be referred to as a second end) of the rotation center shaft 40 which faces in the second axial direction is inserted with a clearance between itself and the boss. The spring 32 is arranged around the boss on the bottom wall. The washer 36 is disposed between the bottom wall and the spring 32.

The side wall 16E of the reducer-housing recess 16C formed on an inner periphery thereof three stationary gear engagement portions 16G which a portion of the stationary gear 28, as will be described later in detail, engages to stop the stationary gear 28 from rotating in the circumferential direction thereof. Each of the stationary gear engagement portions 16G includes the cylindrical pole 161.

The cover plate 34 is made of a steel plate. The cover plate 34 has formed therein the exposure opening 34A through which the pinion gear 30C is exposed outside the reducer-housing recess 16C of the housing 16. The cover plate 34 has a peripheral edge which defines the outline of the exposure opening 34A and is bent toward the first axial direction (i.e., the Z-direction) to form the annular rib 34B.

The worm gear 18 has a spiral tooth formed on an outer periphery thereof. The motor 12 mounted on the rotating shaft 12A is secured to the housing 16, thereby placing the worm gear 18 within the housing 16 and close to the bottom and the inner peripheral surface of the reducer-housing recess 16C.

The helical gear 20 illustrated in FIGS. 1 and 2 is made from resin material. The helical gear 20 has formed on the outer periphery thereof a plurality of external teeth meshing with the helical tooth of the worm gear 18. The eccentric shaft 22 is secured into the axial center of the helical gear 20 using insert-molding techniques. The helical gear 20 is rotatably retained by the housing 16 through the eccentric shaft 22 and the rotation center shaft 40.

The eccentric shaft 22 illustrated in FIGS. 2 and 3 is made of metallic material and has a portion inserted into the helical gear 20 so that it rotates along with the helical gear 20. Specifically, the eccentric shaft 22 has the disc 22A which has a thickness in the axial direction and extends in the radial direction thereof. The disc 22A has formed on an outer circumference thereof protrusions which are arranged adjacent each other in the circumferential direction. The disc 22A is firmly fit in the inner periphery of the helical gear 20 with the center axis thereof coinciding with the center of rotation of the helical gear 20.

The eccentric shaft 22 is, as clearly illustrated in FIGS. 1 and 3, equipped with the support 22B which protrudes from the center of the disc 22A in the first axial direction (i.e., the Z-direction). The support 22B has a first end and a second end which is opposed to the first end and faces in the second axial direction. The first end of the support 22B defines the first supporting portion 22B1 by which the transmission gear 24 is, as will be described later in detail, retained to be rotatable. The second end of the support 22B defines the second supporting portion 22B2 which is larger in diameter than the first supporting portion 22B1 and by which the lock gear 26 is, as will be described later in detail, retained to be rotatable. The first supporting portion 22B1 is oriented to have the axial center offset from that of the disc 22A in the outer radial direction (i.e., the R-direction). The second supporting portion 22132 is oriented to have the axial center offset from that of the disc 22A in the outer radial direction.

Figure 4:
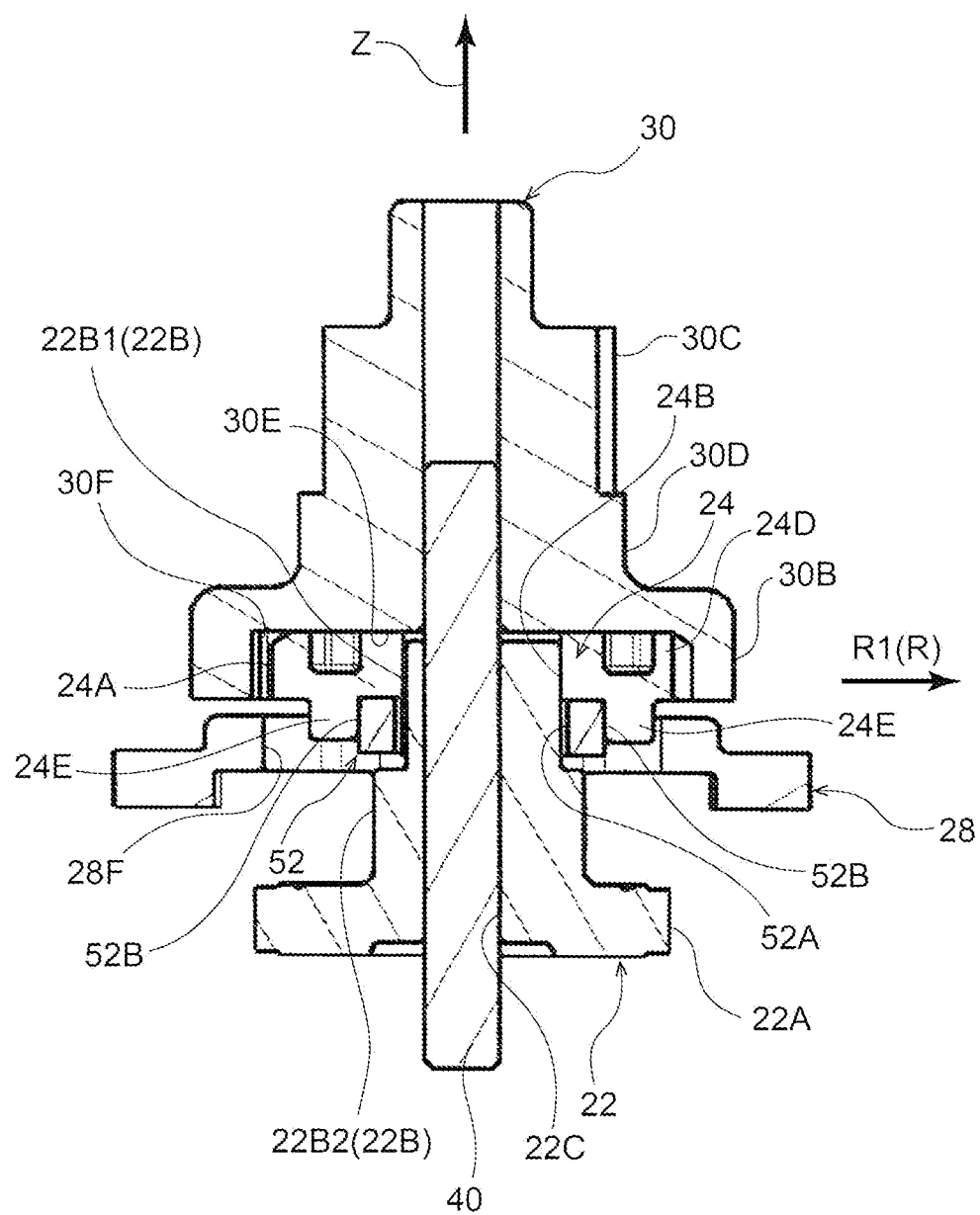
FIG. 4 is a sectional view, as taken in an axial direction of an output gear unit, which illustrates an eccentric shaft, a stationary gear, a transmission gear, and the output gear unit installed in a speed reducer-equipped motor.

The eccentric shaft 22, as illustrated in FIGS. 2, 3, and 4, has formed therein the axial center through-hole 22C extending through the disc 22A, the first supporting portion 2261, and the second supporting portion 22132 in the axial direction thereof. The axial center through-hole 22C has the rotation center shaft 40 inserted thereinto. The axial center of the axial center through-hole 22C (i.e., the axial center of the rotation center shaft 40 inserted into the axial center through-hole 22C) coincides with that of the disc 22A.

The output gear unit 30 illustrated in FIGS. 2 and 4 is made from metallic material. The output gear unit 30, as can be seen in FIG. 2, includes the transmission gear-engaging portion 30B which engages the transmission gear 24. The transmission gear-engaging portion 30B has the recessed housing 30E which opens to the transmission gear 24 (i.e., the second axial direction) in which the transmission gear body 24D of the transmission gear 24 is disposed. The recessed housing 30E has formed in an inner surface of a peripheral portion thereof the internal teeth 30F meshing with the external teeth 24A of the transmission gear 24.

The output gear unit 30 also includes the pinion gear 30C which is arranged on one of axially opposed sides of the transmission gear-engaging portion 30B and axially aligned with the transmission gear-engaging portion 30B. The pinion gear 30C has a plurality of external teeth formed on an outer periphery thereof. The output gear unit 30 has an intermediate portion which is located between the transmission gear-engaging portion 30B and the pinion gear 30C and defines the axially-supported portion 30D which is supported by the rib 34B of the cover plate 34. The rib 34B has firmly fit in an inner periphery thereof the bearing bush 42 made from resin material. This avoids or minimizes a risk that the axially-supported portion 30D of the output gear unit 30 and the rib 34B of the cover plate 34 may experience metal-contact with each other. The output gear unit 30 has the rotation center shaft 40 press-fit in the axial center thereof. The rotation center shaft 40 is of a bar shape made from metallic material.

The stationary gear 28 is produced by pressing metallic material. The stationary gear 28 is, as illustrated in FIGS. 1 and 2, equipped with the stationary gear body 28A of an annular shape, as viewed in the axial direction. The stationary gear 28 is equipped with three fitting protrusions 28B which extend radially outwardly from the stationary gear body 28A. When the fitting protrusions 28B are fit on the stationary gear engagement portions 16G of the housing 6, a push nut, not shown, is fit on the cylindrical poles 161, thereby achieving securement of the stationary gear 28 to the housing 16.

The stationary gear body 28A has formed in an inner periphery thereof a plurality of internal teeth 28D which mesh with the lock gear 26 which will be described later in detail.

The stationary gear 28 is also equipped with the second stopper 28E which protrudes from the stationary gear body 28A in the second axial direction (which is opposite to the Z-direction). Specifically, the second stopper 28E protrudes in the second axial direction from a portion of the circumference of the stationary gear body 28A.

The stationary gear body 28A of the stationary gear 28 has the slider plate-fitting hole 28F formed in a first one of walls thereof opposed to each other in the axial direction. The first wall of the stationary gear body 28A has the internal teeth 28D formed therein. The slider plate-fitting hole 28F is shaped to have a rectangular outline, as viewed in the axial direction. The slider plate 52 is disposed inside the slider plate-fitting hole 28F. The slider plate 52 has a pair of first slider surfaces 52C which will be described later in detail. The slider plate-fitting hole 28F has the second slider surfaces 28G which are defined by inner opposed edges of the slider plate 52 and face each other in the radial direction of the slider plate 52. The slider plate 52 is disposed in the slider-plate fitting hole 27F with each of the first slider surfaces 52C facing one of the second slider surfaces 28G of the slider plate-fitting hole 28F. The first slider surfaces 52C and the second slider surfaces 28G are placed to face each other to stop the slider plate 52 from rotating relative to the stationary gear 28. The first slider surfaces 52C are slidable on the second slider surfaces 28G to permit the slider plate 52 and the transmission gear 24 to move in the radial direction R1 that is an outward radial direction of the stationary gear 28. This causes the transmission gear 24 to revolve around the axial center of the rotation center shaft 40 following rotation of the eccentric shaft 22 while stopping the transmission gear 24 mounted on the first supporting portion 22B1 of the eccentric shaft 22 from rotating around the axis thereof.

The transmission gear 24 is, as illustrated in FIGS. 1, 2, 3, and 4, produced by pressing a metallic material into a circular shape. The transmission gear 24 includes the transmission gear body 24D which has the external teeth 24A formed on the outer circumference thereof. The transmission gear body 24D has formed in the center thereof the fitting hole 24B which fits on the first supporting portion 22B1 of the eccentric shaft 22. The transmission gear 24 has two stopper protrusions 24E which extend from an end surface of the transmission gear body 24D which faces in the second axial direction. The stopper protrusions 24E are arranged at an angular interval of 180° away from each other in the circumferential direction of the transmission gear 24. The stopper protrusions 24E engages the slider plate 52, as will be described later in detail, to stop the eccentric shaft 22 of the transmission gear 24 from rotating around the first supporting portion 22B1 of the eccentric shaft 22 (i.e., around the center axis of the eccentric shaft 22).

The slider plate 52 illustrated in FIGS. 1 and 3 is made of a metallic plate and of a rectangular shape, as viewed in the axial direction. The slider plate 52 is arranged between the two stopper protrusions 24E of the transmission gear 24 within the slider plate-fitting hole 28F of the stationary gear 28. The slider plate 52 has the engaging surfaces 52B on the circumference thereof. Each of the engaging surfaces 52B faces a respective one of the stopper protrusions 24E in the radial direction. In the condition where the slider plate 52 is placed between the stopper protrusions 24E of the transmission gear 24, the stopper protrusions 24E work to stop the transmission gear 24 from moving relative to the slider plate 52 in a direction (i.e., the radial direction R1) in which the engaging surfaces 52B and the stopper protrusions 24E face each other and also stop the transmission gear 24 from rotating relative to the slider plate 52 (i.e., around the center of the transmission gear 24). The stopper protrusions 24E are slidable on the engaging surfaces 52B, thereby permitting the transmission gear 24 to move relative to the slider plate 52 in a direction in which the engaging surfaces 52B and the stopper protrusions 24E slide on each other in the second radial direction R2 perpendicular to the radial direction R1. The outer periphery of the slider plate 52 has the pair of first slider surfaces 52C which faces the second slider surfaces 28G of the slider plate-fitting hole 28F and are arranged close to the slider surfaces 28G. The slider plate 52 has formed in the center thereof the elongated hole 52A into which the first supporting portion 22B1 of the eccentric shaft 22 is inserted. The elongated hole 52A is shaped to have a length extending in the second radial direction R2. The interval or distance between the engaging surfaces 52B of the slider plate 52 is selected to be smaller than that between the first slider surfaces 52C. The engaging surfaces 52B, therefore, define long opposite sides of the rectangular shape of the slider plate 52, while the first slider surfaces 52C define short opposite sides of the rectangular shape of the slider plate 52.

The lock gear 26 is, like the transmission gear 24, as illustrated in FIGS. 1 and 2, made by pressing a metallic material into a disc shape. The lock gear 26 has formed on the whole of an outer periphery thereof external teeth 26A meshing with the internal teeth 28D of the stationary gear 28. The lock gear 26 has formed in the center thereof the fitting hole 26B which is fit on the second supporting portion 2262 of the eccentric shaft 22. The lock gear 26 also includes the first stopper 26C which extends radially outwardly and has a fan-shape, as viewed in the axial direction. The first stopper 26C is formed on a portion of the circumference of the lock gear 26. In a condition where the external teeth 26A of the lock gear 26 mesh with the internal teeth 28D of the stationary gear 28, the first stopper 26C is located over one of major opposite surfaces of the stationary gear body 28A of the stationary gear 28 which faces in the second axial direction.

Operation and Advantageous Effect of this Embodiment

The operation of and advantageous effects offered by this embodiment will be described below.

In the speed reducer-equipped motor 10 illustrated in FIGS. 1 and 2, when the rotating shaft 12A of the motor 12 starts to rotate, it will cause the worm gear 18 to rotate. The rotation of the worm gear 18 causes the helical gear 20 which meshes with the worm gear 18 to rotate along with the eccentric shaft 22.

Figure 5:
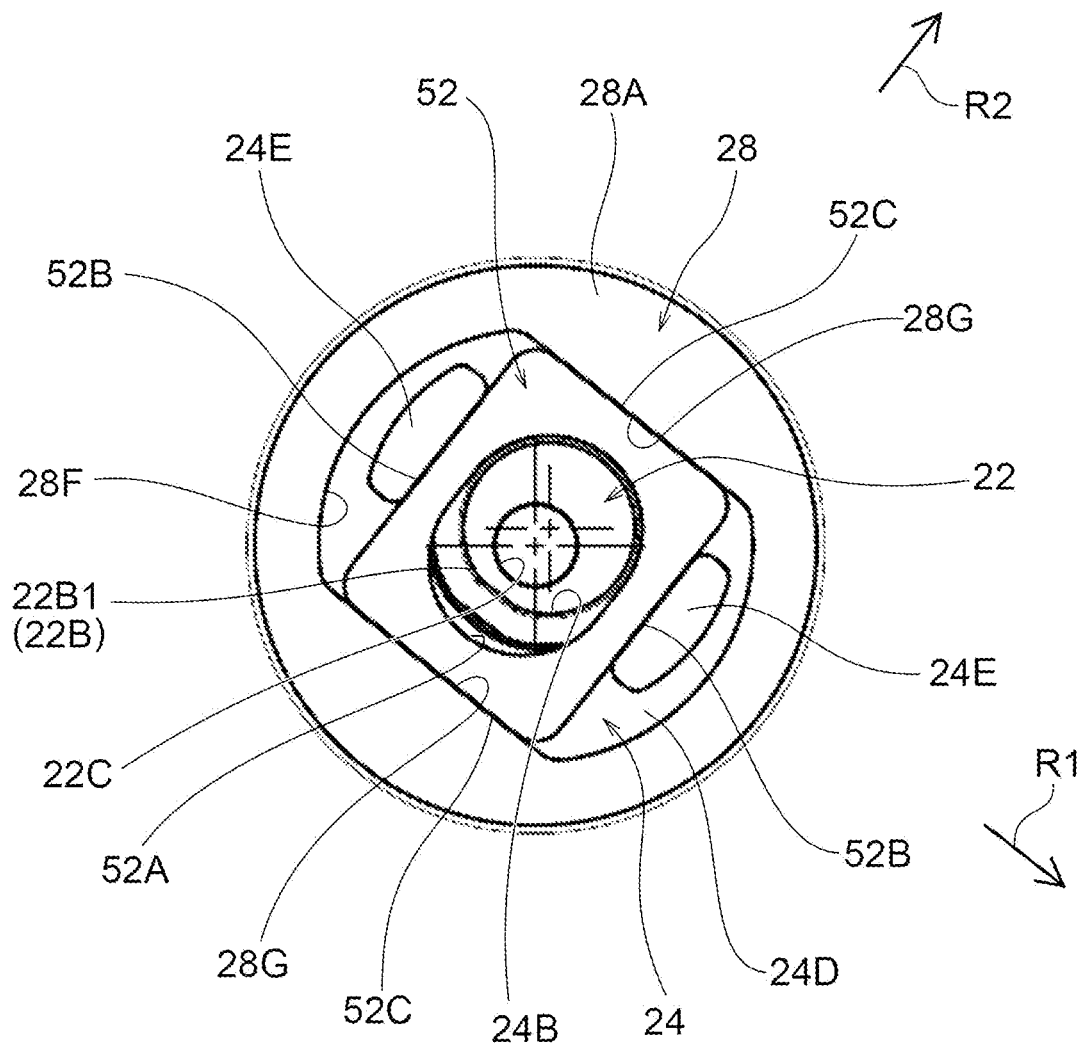
FIG. 5 is a front view which schematically illustrates a stationary gear, a slider plate, and a transmission gear installed in a speed reducer-equipped motor.

The rotation of the eccentric shaft 22 causes the center of the transmission gear 24 mounted on the first supporting portion 22B1 of the eccentric shaft 22 to revolve around the center of the rotation center shaft 40. Specifically, referring to FIG. 5, when the eccentric shaft 22 rotates, the stopper protrusions 24E of the transmission gear 24 slide on the engaging surfaces 52B of the slider plate 52 and move in the radial direction (i.e., opposite to the direction R2). The first slider surfaces 52C of the slider plate 52 also slides on the second slider surfaces 28G of the stationary gear 28, so that the slider plate 52 and the transmission gear 24 are moved in the radial direction (i.e., opposite the direction R1). This causes the center of the transmission gear 24 to revolve around the center of the rotation center shaft 40 while holding the transmission gear 24 mounted on the first supporting portion 22B1 of the eccentric shaft 22 from rotating around the center axis thereof The revolution of the transmission gear 24, as illustrated in FIGS. 1 and 2, causes torque produced by such revolution to be transmitted from the external teeth 24A of the transmission gear 24 to the output gear unit 30 through the internal teeth 30F of the output gear unit 30. This causes the output gear unit 30 to rotate, thereby actuating the power seat of the vehicle through a gear meshing with the pinion gear 30C of the output gear unit 30.

The rotation of the eccentric shaft 22 causes the lock gear 26 which is mounted on the second supporting portion 22132 of the eccentric shaft 22 and meshes with the stationary gear 28 to revolute around the center of the rotation center shaft 40 and also rotates around the center axis thereof. When the first stopper 26C of the lock gear 26 contacts with the second stopper 28E of the stationary gear 28, it stops both the rotation and the revolution of the lock gear 26. This holds the eccentric shaft 22 and the helical gear 20 from rotating, thereby stopping the rotation of the output gear unit 30. This avoids or minimizes input of undesirable excessive torque from the speed reducer-equipped motor 10 to the power seat of the vehicle.

The speed reducer 14 which constitutes a portion of the structure of the speed reducer-equipped motor 10 is, as described above, designed as a planetary gear speed reducer. It is, therefore, preferable that a gear which is required to stop its rotation is selected depending upon a speed reduction ratio which the speed reducer 14 is required to have. Specifically, the speed reducer 14 may be implemented by 2K-H planetary gear mechanism, a 3K planetary gear mechanism, a solar speed reducer, or a star speed reducer depending upon a speed reduction ratio required for the speed reducer 14.

Structure Ensuring Stability of Contact Between Slider Plate 60 and Stopper Protrusion 24E of Transmission Gear 24

The structure or mechanism for ensuring the stability in contact between the slider plate 60 and the stopper protrusions 24E of the transmission gear 24 will be described below in detail. First, the structure of the slider plate 62 and deformation of the stopper protrusions 24E which may occur in a speed reducer-equipped motor including the slider plate 62 will be discussed below. Subsequently, the structure of the slider plate 60 in this embodiment configured to minimize the deformation of the stopper protrusions 24E which would occur in the speed reducer-equipped motor including the slider plate 62 in the comparative example will be described.

Figure 6:
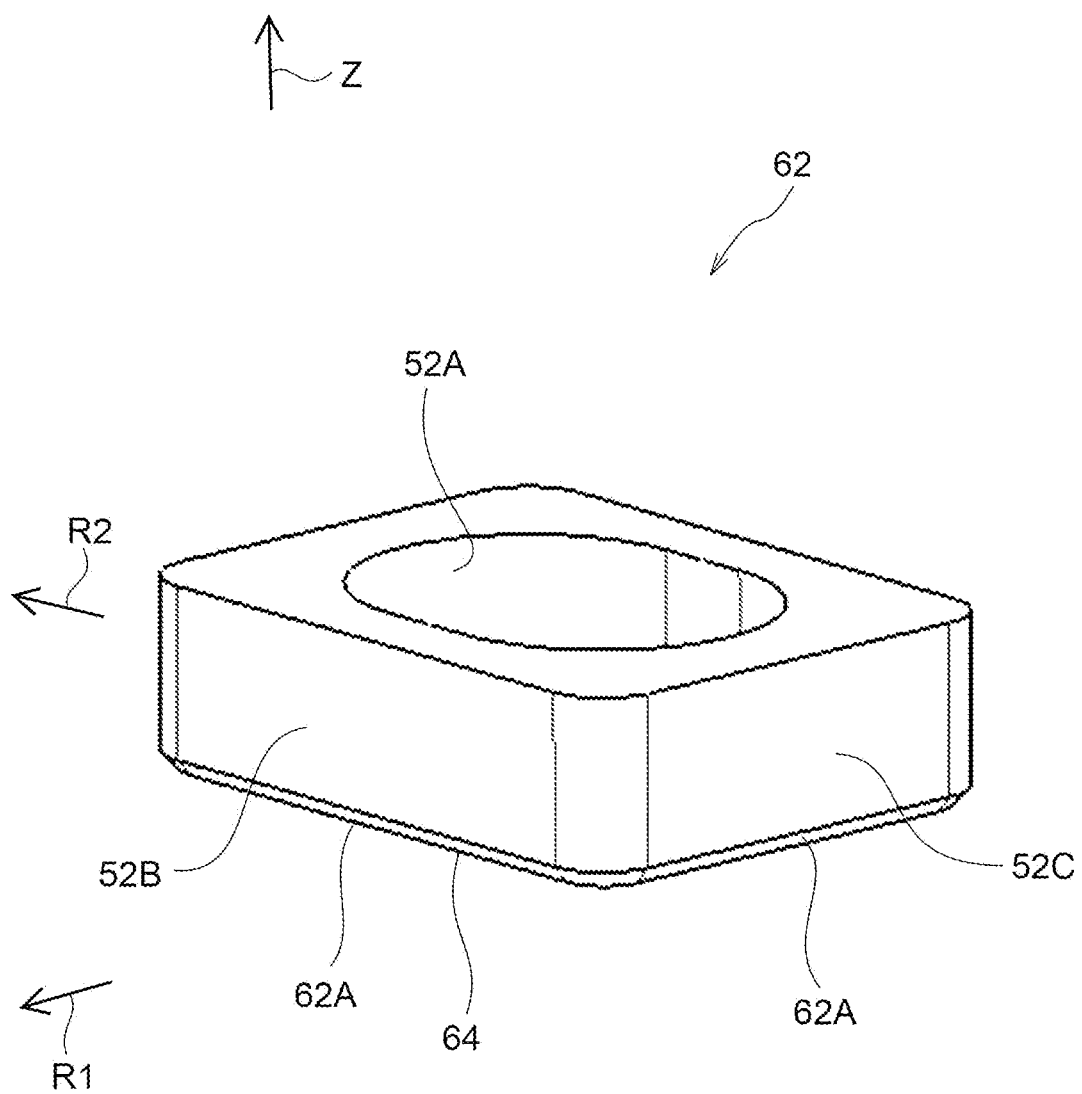
FIG. 6 is a perspective view which illustrates a slider plate in a comparative example.

FIG. 6 illustrates the structure of the slider plate 62 in the comparative example which is nearly identical with that of the above-described slider plate 52. The same parts of the slider plate 62 as those of the slider plate 52 are denoted by the same reference numbers, and explanation thereof in detail will be omitted here.

Figure 7:
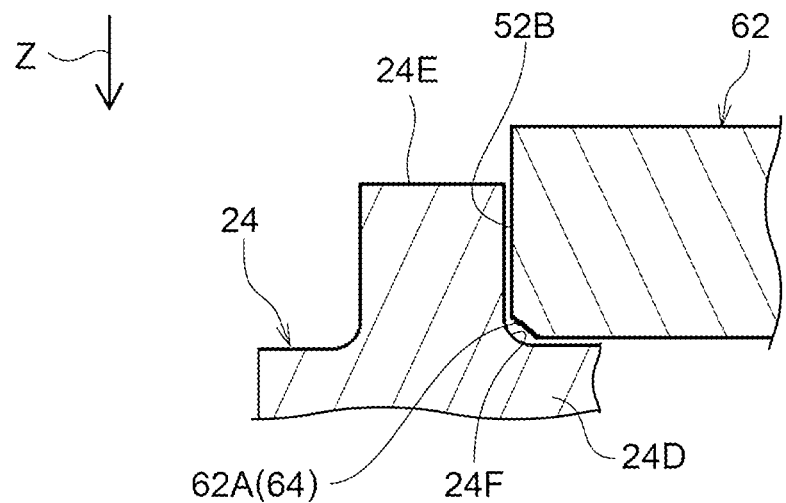
FIG. 7 is an enlarged sectional view which illustrates a contact between a stopper protrusion and a slider plate.

The slider plate 62 in the comparative example, as clearly illustrated in FIGS. 6 and 7, has one (which will also be referred to below as a first surface) of major surfaces opposed to each other in the thickness direction which faces the transmission gear body 24D of the transmission gear 24. The first surface has the corners 64 which are rounded or chambered in a C-shape and will also be referred to below as chamfered corners 62A. The chamfered corners 62A are shaped to have dimensions selected to avoid mechanical interference of the corners 64 with the rounded corner 24F of each of the stopper protrusions 24E which leads to a major part of the transmission gear body 24D, in other words, located at a base end of the stopper protrusion 24E which is closer to the transmission gear body 24D in a condition where the stopper protrusions 24E are placed in physical contact with the engaging surface 52B of the slider plate 62.

Figure 8:
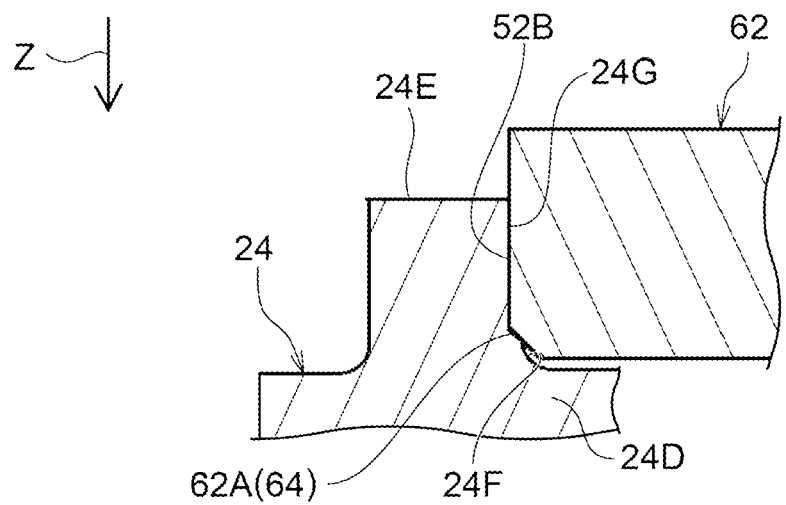
FIG. 8 is an enlarged sectional view which illustrates deformation of a stopper protrusion when the stopper plate is in physical contact with a slider plate.
Figure 9:
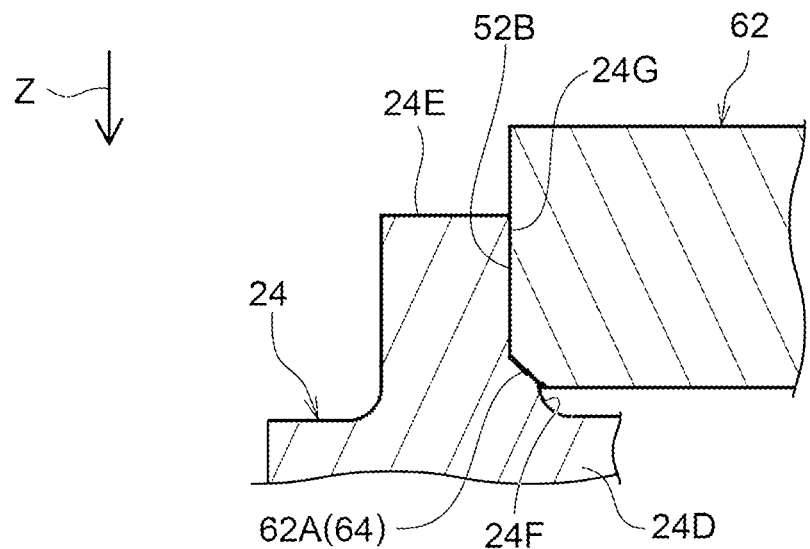
FIG. 9 is an enlarged sectional view which illustrates a contact of a slider plate and each stopper protrusion which is deformed more greatly than in FIG. 8.

When the pressure of contact between each of the stopper protrusions 24E and a corresponding one of the engaging surfaces 52B of the slider plate 62 rises, it may cause, as demonstrated in FIG. 8, the slider plate 62 to be undesirably forced against the stopper protrusions 24E along the chamfered corners 62A and deform portions of the stopper protrusions 24E. In the following discussion, the deformed portions of the stopper protrusions 24E will also be referred to below as the deformed portions 24G. With this condition, the continuous use of the speed reducer-equipped motor including the slider plate 62 will cause, as demonstrated in FIG. 9, the slider plate 62 to be further forced against the stopper protrusions 24E along the chamfered corners 62A, thus resulting in excessive deformation of the stopper protrusions 24E, in other words, an increase in volume of the deformed portions 24G. In this way, the state of contact between the slider plate 62 and the stopper protrusions 24E of the transmission gear 24 changes, thereby resulting in instability of contact of the slider plate 62 with the stopper protrusions 24E.

Figure 10:
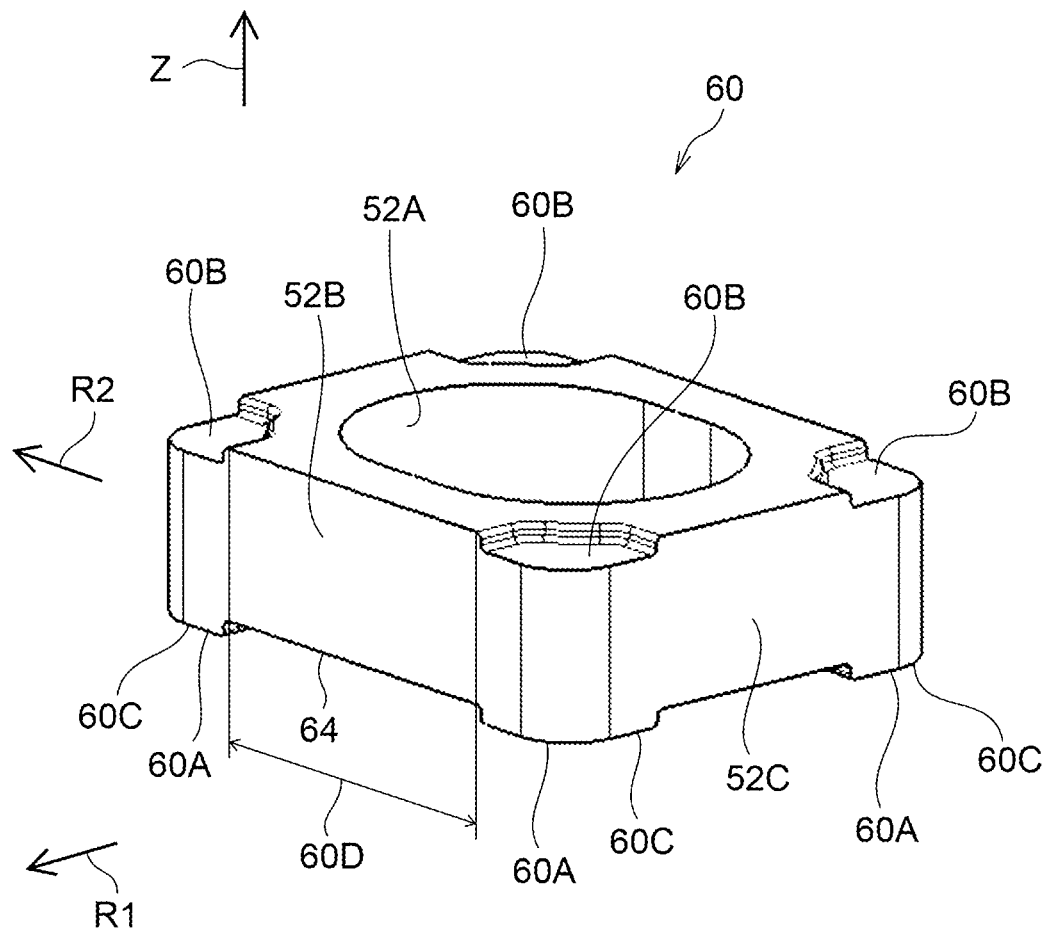
FIG. 10 is a perspective view which illustrates a slider plate equipped with interference avoidance protrusions.
Figure 11:
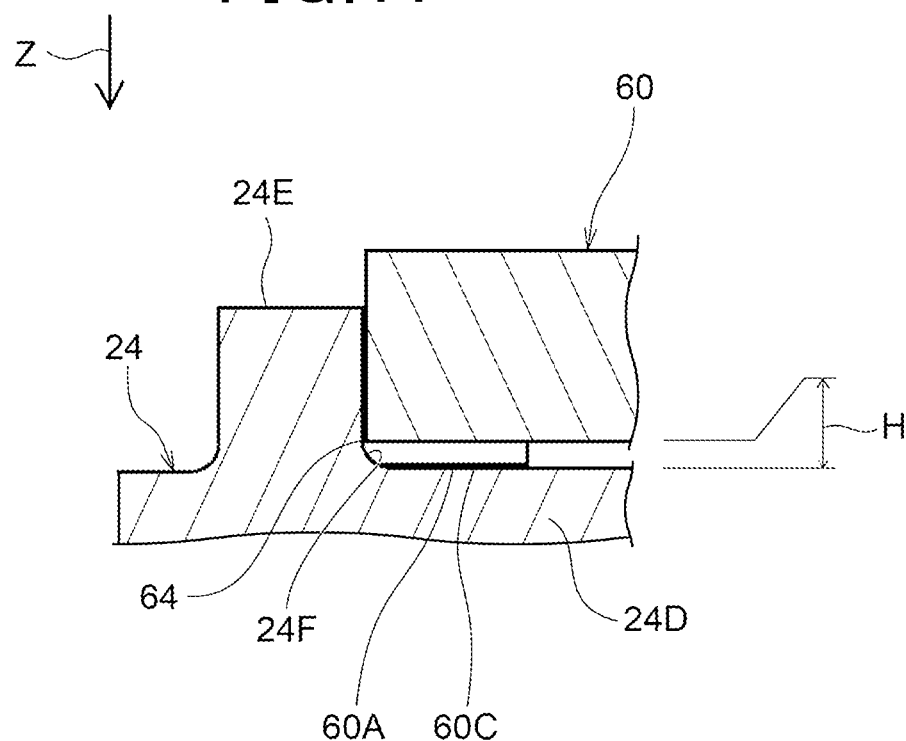
FIG. 11 is an enlarged sectional view which illustrates a contact between a stopper protrusion and a slider plate equipped with interference avoidance protrusions.

In order to alleviate the above adverse event, the speed reducer-equipped motor 10 includes the slider plate 60 which works as a rotation stopper and is, as illustrated in FIGS. 10 and 11, equipped with four interference avoidance protrusions 60A which work as an interference avoider and extend toward the transmission gear body 24D of the transmission gear 24 (i.e., the first axial direction). The interference avoidance protrusions 60A are formed integrally with the slider plate 60 at the same time as when the slider plate 60 is forged. The interference avoidance protrusions 60A are located on four corners of the slider plate 60, as viewed in the first axial direction. The slider plate 60 also has four recesses 60B formed in the surface thereof facing in the second axial direction. Specifically, the recesses 60B are formed in portions of the surface of the slider plate 60 which are aligned, one with each of the interference avoidance protrusions 60A in the axial direction. The same reference numbers of other parts of the slider plate 60 as employed for the slider plate 52 indicate the same or similar parts, and explanation thereof in detail will be omitted here.

Each of the interference avoidance protrusions 60A has a head end surface 60C which is flat contacting with the second surface of the transmission gear body 24D which faces in the second axial direction. Each of the interference avoidance protrusions 60A has a dimension H in a direction in which the interference avoidance portions 60A protrude in the axial direction is selected to eliminate a risk that the corners 64 of the slider plate 60 which face the transmission gear body 24D of the transmission gear 24 may physically interfere with the rounded corners 24F of the stopper protrusions 24E when the head end surfaces 60C of the interference avoidance protrusions 60A is in physical contact with the second axial surface of the transmission gear body 24D of the transmission gear 24, and when the stopper protrusions 24E is in physical contact with the engaging surfaces 52B of the slider plate 60.

An area of each of the engaging surfaces 52B of the slider plate 60 on which a corresponding one of the stopper protrusions 24E slides is defined as a sliding region 60D. The slider plate 60 in this disclosure is designed to have the four interference avoidance protrusions 60A offset outside the sliding regions 60D, as viewed facing the engaging surfaces 52B in the radial direction. Specifically, two of the interference avoidance protrusions 60A arranged close to a respective one of the engaging surfaces 52B are located outside, in other words, offset from a corresponding one of the sliding regions 60D in the radial direction R1 and a second radial direction which is opposite the radial direction R1, respectively. The corners 64 of the slider plate 60 which face the transmission gear body 24D of the transmission gear 24 are also shaped not to have chamfered surfaces, such as the chamfered corners 62A of the slider plate 62.

The use of the above-described slider plate 60 with the speed reducer-equipped motor 10 causes all the interference avoidance protrusions 60A of the slider plate 60 to physically contact with the second axial surface of the transmission gear body 24D of the transmission gear 24 which face in the second axial direction. This eliminates the risk that the corners 64 of the slider plate 60 which face the transmission gear body 24D of the transmission gear 24 may physically interfere with the rounded corners 24F of the stopper protrusions 24E when the speed reducer-equipped motor 10 is operating. The corners 64 of the slider plate 60 are, as described above, shaped not to have chamfered surfaces, such as the chamfered corners 62A of the slider plate 62 in the comparative example. The use of the above structure of the slider plate 60 with the speed reducer-equipped motor 10, therefore, minimizes or eliminates the risk that the corners 64 of the slider plate 60 may be forced against the stopper protrusions 24E to cause the undesirable deformation of the stopper protrusions 24E when the speed reducer-equipped motor 10 is operating. This ensures the stability of physical contact of the slider plate 60 with the stopper protrusions 24E of the transmission gear 24.

The interference avoidance protrusions 60A are, as described above, all formed integrally with the slider plate 60, thereby enabling the number of parts of the speed reducer-equipped motor 10 to be decreased. The structure of the slider plate 60 also eliminates the need for machining the corners 64 to have chamfered surfaces, such as the chamfered corners 62A of the slider plate 62 in the comparative example.

The slider plate 60, as described above, has the four interference avoidance protrusions 60A formed on the four corners of the surface thereof facing in the first axial direction (i.e., the Z-direction). This avoids undesirable tilting of the slider plate 60 relative to the transmission gear 24 when all the interference avoidance protrusions 60A contact with the second axial surface of the transmission gear body 24D of the transmission gear 24.

The slider plate 60, as described above, has the interference avoidance protrusions 60A offset outside the sliding regions 60D, as viewed facing the engaging surfaces 52B in the radial direction, thereby eliminating the risk of interference of the corners 64 of the slider plate 60 with the rounded corners 24F of the stopper protrusions 24E regardless of a positional relation between the stopper protrusions 24E of the transmission gear 24 and the slider plate 60.

Speed Reducer-Equipped Motor in the Second Embodiment

A speed reducer-equipped motor in the second embodiment will be described below with reference to FIGS. 12 and 13.

Figure 12:
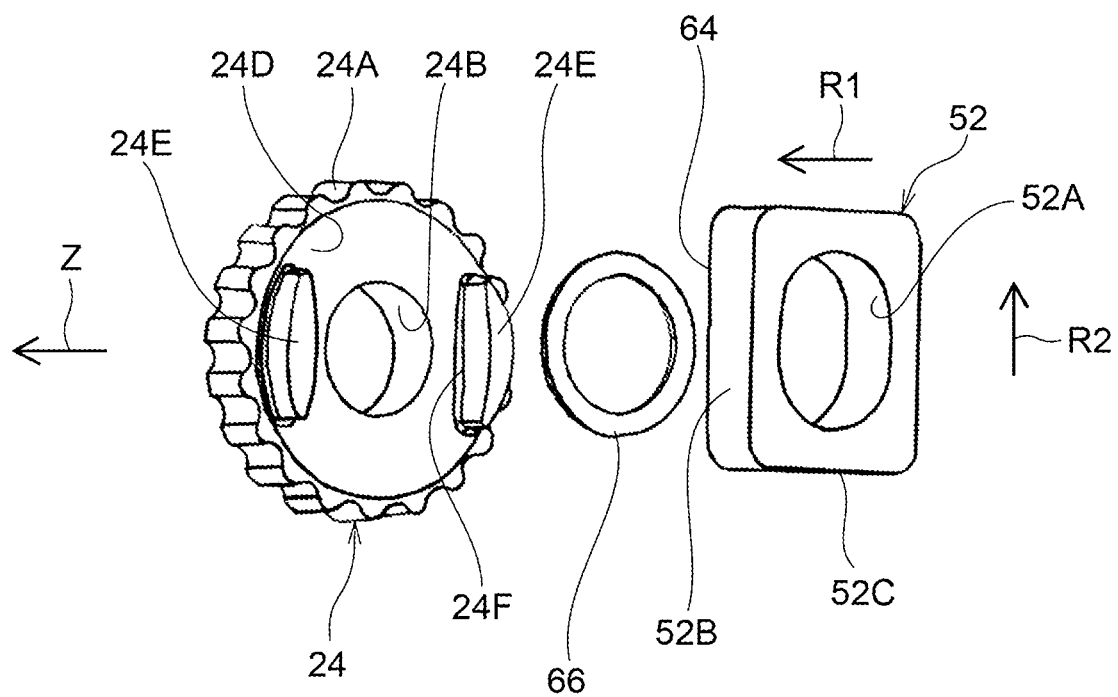
FIG. 12 is an exploded perspective view which illustrates a transmission gear, a washer, and a slider plate.
Figure 13:
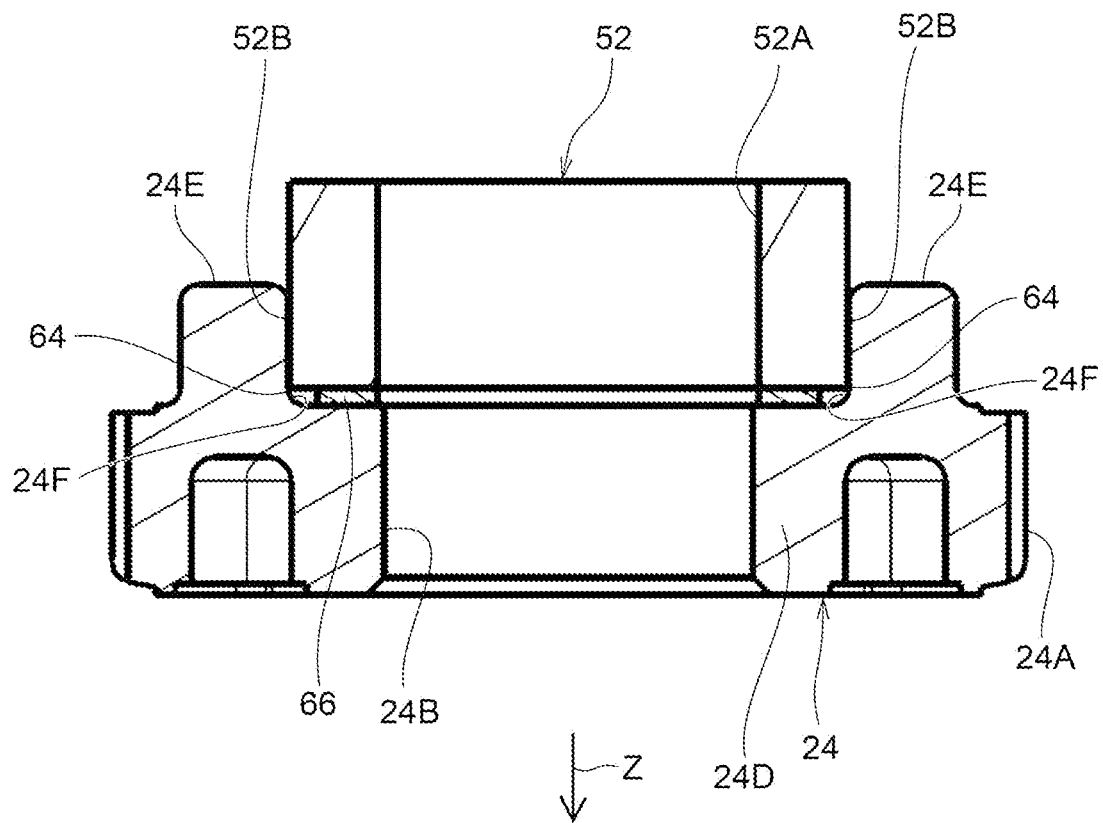
FIG. 13 is a sectional view, as taken in an axial direction of a speed reducer-equipped motor, which illustrates a transmission gear, a washer, and a slider plate.

A speed reducer-equipped motor according to the second embodiment is, as illustrated in FIGS. 12 and 13, equipped with the transmission gear 24 and the slider plate 52 which are identical in structure with those of the above-described speed reducer-equipped motor 10. The speed reducer-equipped motor in this embodiment also includes the washer 66 which works as an interference avoider disposed between the transmission gear 24 and the slider plate 52. The washer 66 is shaped to have an outer diameter smaller than an interval between the engaging surfaces 52B of the slider plate 52. The washer 66 also has an inner diameter which is greater than an inner diameter of the fitting hole 24B of the transmission gear 24 and substantially identical with a length of the short axis of the ellipse through-hole 52A of the slider plate 52. The washer 66 has a thickness which is selected to achieve no physical interference between the corners 64 of the slider plate 52 close to the transmission gear body 24D of the transmission gear 24 and the rounded corners 24F of the bottoms of the stopper protrusions 24E in conditions where the washer 66 is gripped between the transmission gear 24 and the slider plate 52, and the stopper protrusions 24E is in contact with the engaging surfaces 52B of the slider plate 60.

The speed reducer-equipped motor in the second embodiment, like the speed reducer-equipped motor with the above-described slider plate 60, works to ensure the stability in contact between the slider plate 52 and the stopper protrusions 24E of the transmission gear 24.

Speed Reducer-Equipped Motor in the Third Embodiment

A speed reducer-equipped motor according to the third embodiment will be described below with FIG. 14.

Figure 14:
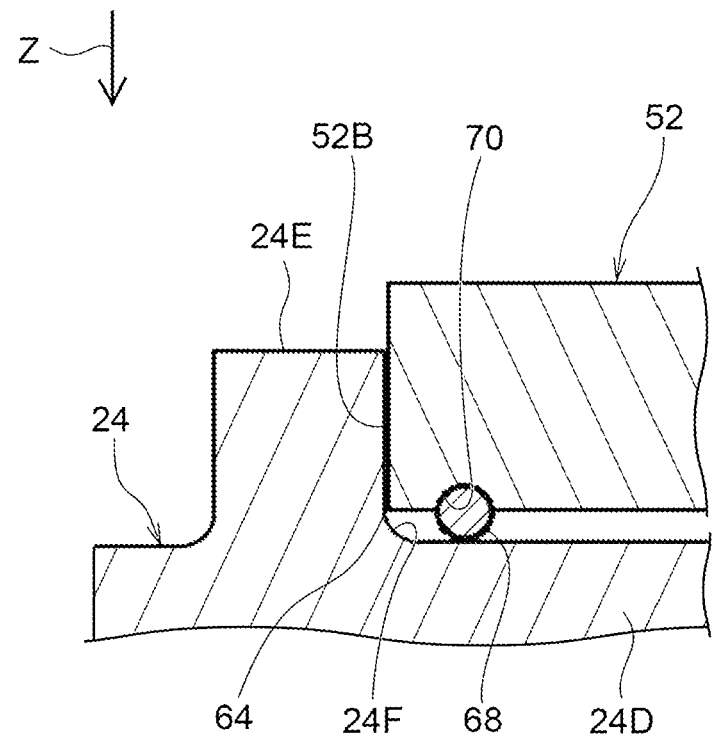
FIG. 14 is an enlarged sectional view, as taken in an axial direction of a speed reducer-equipped motor, which illustrates a transmission gear, spherical members, and a slider plate.

The speed reducer-equipped motor in the third embodiment, as illustrated in FIG. 14, includes the transmission gear 24 and the slider plate 52 which are substantially identical in structure with those of the speed reducer-equipped motor 10. The speed reducer-equipped motor in this embodiment includes a plurality of spherical members 68 which are disposed between the transmission gear 24 and the slider plate 52 and work as interference avoiders. Specifically, the speed reducer-equipped motor includes four spherical members 68 in the form of balls. The slider plate 52 has four fitting recesses 70 which are formed in four corners of the slider plate 52, as viewed in the axial direction thereof, and in each of which a respective one of the spherical members 68 is partially fit.

The distance by which each of the spherical members 68 extends outside the slider plate 52 is selected to achieve no physical interference between the corners 64 of the slider plate 52 close to the transmission gear body 24D of the transmission gear 24 and the rounded corners 24F of the bottoms of the stopper protrusions 24E in conditions where the spherical members 68 are in contact with the surface (i.e., the bottom) of the transmission gear body 24D of the transmission gear 24 which faces in the second axial direction, and the stopper protrusions 24E is in contact with the engaging surfaces 52B of the slider plate 60.

The speed reducer-equipped motor in the third embodiment, like the speed reducer-equipped motor with the above-described slider plate 60, works to ensure the stability in contact between the slider plate 52 and the stopper protrusions 24E of the transmission gear 24.

The embodiments of this disclosure have been described above, but however, this disclosure is not limited to the above statements. The disclosure should be understood to include all possible embodiments and modifications to the shown embodiments which can be embodied without departing from the principle of the disclosure.

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

What is claimed is:

1. A speed reducer-equipped motor comprising:
a motor with a rotating shaft;
a first gear which rotates in response to input of torque from the rotating shaft of the motor;
an eccentric shaft which connects with the first gear and includes a support which is offset from a rotating shaft of the first gear in a radial direction thereof;
a transmission gear which is retained by the support and includes a stopper protrusion protruding toward the first gear, the transmission gear revolving around the rotating shaft of the first gear following rotation of the first gear along with the eccentric shaft;
an output member which rotates in response to revolution of the transmission gear;
a rotation stopper on which the stopper protrusion slides in contact therewith to stop the transmission gear from rotating around an axis thereof; and
an interference avoider which is disposed between the rotation stopper and the transmission gear and works to avoid physical interference between a corner of the rotation stopper which faces the stopper protrusion and a base end portion of the stopper protrusion, wherein
the interference avoider is arranged between the rotation stopper and the transmission gear, and
the interference avoider is made of a member discrete from the rotation stopper and the transmission gear and has an annular or spherical shape.

2. A speed reducer-equipped motor comprising:
a motor with a rotating shaft;
a first gear which rotates in response to input of torque from the rotating shaft of the motor;
an eccentric shaft which connects with the first gear and includes a support which is offset from a rotating shaft of the first gear in a radial direction thereof;
a transmission gear which is retained by the support and includes a stopper protrusion protruding toward the first gear, the transmission gear revolving around the rotating shaft of the first gear following rotation of the first gear along with the eccentric shaft;
an output member which rotates in response to revolution of the transmission gear;
a rotation stopper on which the stopper protrusion slides in contact therewith to stop the transmission gear from rotating around an axis thereof; and
an interference avoider which is disposed between the rotation stopper and the transmission gear and works to avoid physical interference between a corner of the rotation stopper which faces the stopper protrusion and a base end portion of the stopper protrusion, wherein
the interference avoider includes an interference avoidance protrusion which protrudes toward the transmission gear and is formed integrally with the rotation stopper.

3. The speed reducer-equipped motor as set forth in claim 1, wherein the stopper protrusion of the transmission gear includes a pair of stopper protrusions between which the rotation stopper is arranged.

4. The speed reducer-equipped motor as set forth in claim 2, wherein the rotation stopper is formed in a shape of a rectangular block, and wherein the interference avoidance protrusion includes four protrusions arranged on four corners of the rotation stopper, as viewed in an axial direction of the eccentric shaft.

5. The speed reducer-equipped motor as set forth in claim 4, wherein the rotation stopper has engaging surfaces each of which faces a respective one of the stopper protrusions in a radial direction of the eccentric shaft, and
an area of each of the engaging surfaces on which a corresponding one of the stopper protrusion slides is defined as a sliding region,
the interference avoidance protrusions being offset from the sliding regions in the radial direction of the eccentric shaft.

* * * * *